Figure 1:
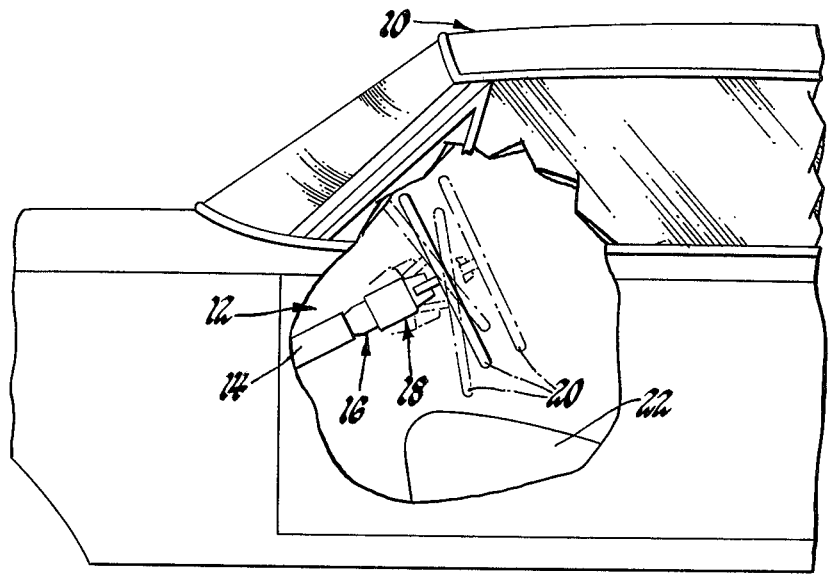

United States Patent [19]

Bradley et al.

[11] 3,881,366

[45] May 6, 1975

[54] ADJUSTABLE STEERING COLUMN

[75] Inventors: Arthur W. Bradley, Saginaw; Robert L. White, Frankenmuth, both of Mich.

[73] Assignee: General Motors Corporation, Detroit, Mich.

[22] Filed: Nov. 19, 1973

[21] Appl. No.: 416,949

[52] U.S. Cl. ............... 74/493; 74/495; 403/109
[51] Int. Cl. .............................................. B62d 1/18
[58] Field of Search ...... 74/493, 495; 403/109, 110, 403/366, 377

[56] References Cited
UNITED STATES PATENTS

| | | | |
|---|---|---|---|
| 2,075,110 | 3/1937 | Garretson | 74/493 |
| 2,806,722 | 9/1957 | Atkins | 403/109 |
| 3,258,987 | 7/1966 | Zeigler et al. | 74/493 |

*Primary Examiner*—Samuel Scott
*Assistant Examiner*—John Reep
*Attorney, Agent, or Firm*—Saul Schwartz

[57] ABSTRACT

In a vehicle steering column having a main steering shaft, an intermediate shaft rotatable as a unit with the main shaft, an adjustable shaft rotatable as a unit with the intermediate shaft and axially bodily shiftable relative to the latter, and a steering handwheel rigidly attached to the adjustable shaft, a locking arrangement between the intermediate shaft and the adjustable shaft including a rod threadedly received on the intermediate shaft perpendicular to the adjustable shaft, and a semicircular key on the intermediate shaft engageable by an end of the rod and defining a lever operative to multiply the force exerted by the rod and apply the multiplied force to the adjustable shaft. The force exerted by the key on the adjustable shaft generates a proportional friction force which prevents relative axial movement between the adjustable shaft and the intermediate shaft.

3 Claims, 2 Drawing Figures

PATENTED MAY 6 1975

3,881,366

ADJUSTABLE STEERING COLUMN

This invention relates generally to vehicle steering columns and, more particularly, to a locking arrangement for maintaining the axial position of an axially adjustable steering handwheel.

Automobiles are, of course, purchased and operated by large numbers of people having significantly different physical characteristics such as height, weight, arm length, and the like. In order to render directional control of the vehicle as convenient and comfortable as possible for the largest number of potential operators, engineers have proposed various steering column structures which can be adjusted within limits to suit the particular physical characteristics of the operator. One such steering column which is currently in use incorporates a housing on the end of the steering column assembly which is pivotable about a horizontal axis for tilt adjustment and which provides for axial or longitudinal adjustment of a steering handwheel rotatably supported on the tiltable housing. In this particular structure the handwheel is rigidly attached to an axially adjustable shaft which, in turn, slides within an intermediate shaft rotatably supported on the tiltable housing. To lock the adjustable shaft in any desired axial position, a rod projects down the center of the adjustable shaft and engages a key which can be forced by the rod against the inside of the intermediate shaft. This arrangement is, of course, functionally satisfactory. It may, however, be desirable to eliminate the center rod and its related control apparatus to yield more available space at the center of the steering handwheel. An axial adjustment locking arrangement according to this invention represents an improvement over heretofore known similar structures in that locking of the adjustable shaft is effected without an axially located rod and corresponding internal key.

Figure 2:
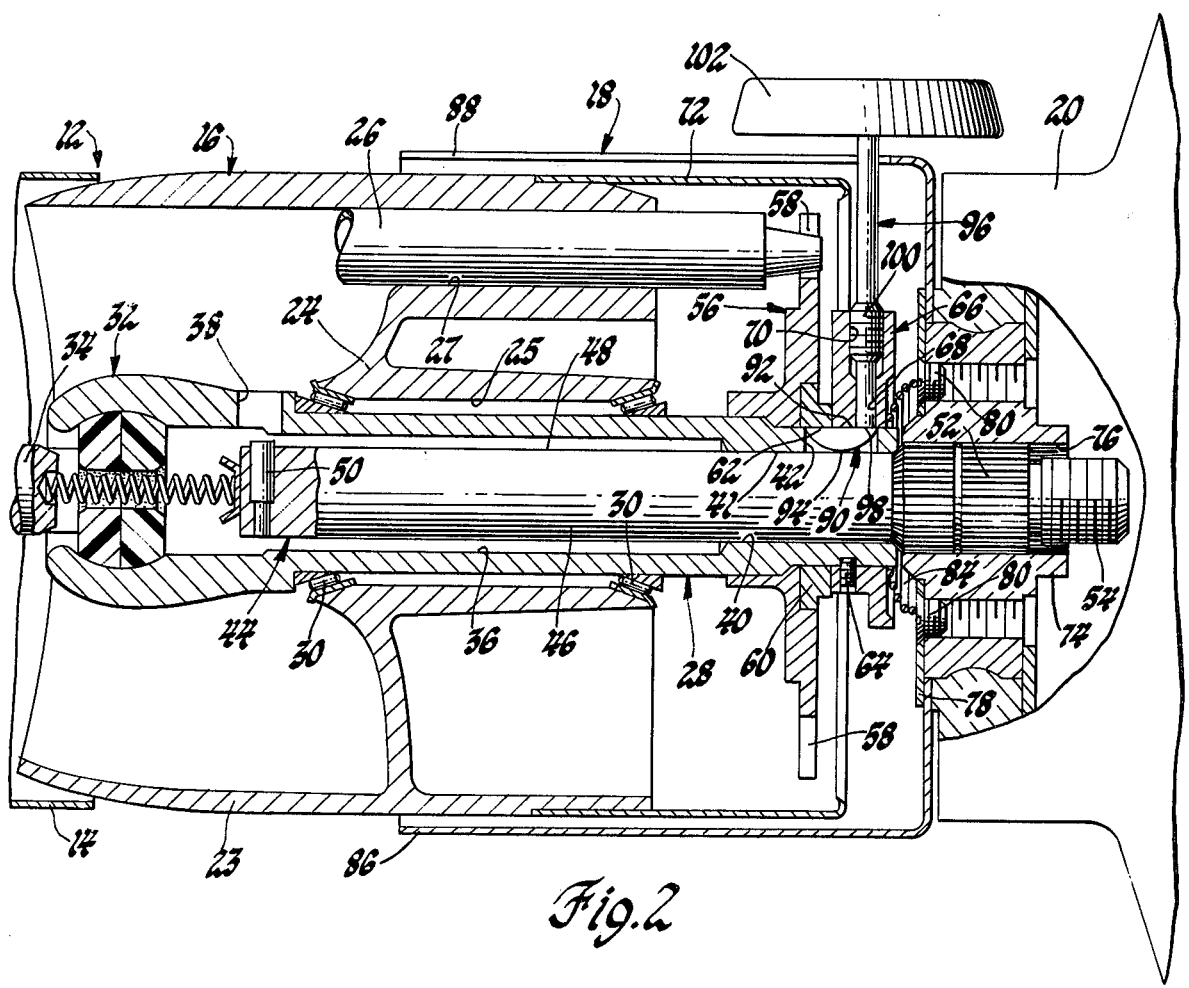

The primary feature, then, of this invention is that it provides an improved steering column assembly including an axially adjustable steering handwheel. Another feature of this invention resides in the provision in the steering column assembly of a new and improved locking arrangement for maintaining the axially adjustable steering handwheel in any adjusted position. Still another feature of this invention resides in the provision in the improved locking arrangement of a rod disposed on the rotatable intermediate shaft and shiftable transversely of the longitudinal axis of rotation of the latter to a locking position exerting a force on a lever supported on the intermediate shaft, the lever bearing against the adjustable shaft and multiplying the force applied by the rod thereby to generate substantial friction between the adjustable shaft and the intermediate shaft for preventing relative axial movement therebetween. A further feature of this invention resides in the provision in the new and improved locking arrangement of a lever in the form of a semi-circular key having a flat edge and a curved edge, the key being disposed in a slot in the intermediate shaft with one end underlying a ledge on the intermediate shaft which functions as the lever fulcrum and with the curved edge engaging the adjustable shaft so that a force exerted on the other end of the key by the rod is multiplied by the lever and applied to the adjustable shaft. These and other features of this invention will be readily apparent from the following specification and from the drawings wherein:

FIG. 1 is a fragmentary partially broken away side elevational view of an automotive vehicle incorporating an adjustable steering column according to this invention; and FIG. 2 is an enlarged fragmentary top plan view, partly in section, illustrating the details of a steering column constructed according to this invention.

Referring now to the drawings, FIG. 1 depicts in side elevation the forward portion of a typical automotive vehicle designated generally 10. Disposed interiorly of the vehicle in the usual position is a steering column 12 including an angularly inclined support tube or mast jacket 14 rigidly supported on the vehicle. The steering column further includes a tiltable housing 16 and an axially adjustable or telescoping section 18 supported on the tiltable housing 16. As described more fully hereinafter, a steering handwheel 20 is supported on the telescoping section 18 and is adapted for movement between a plurality of longitudinal and angular positions relative to the mast jacket. More particularly, as shown in broken lines, the tiltable housing 16, the telescoping section 18 and the handwheel 20 are adapted for tilting movement as a unit about a horizontal transverse axis in both directions from a normal position, shown in solid lines in FIG. 1, wherein the plane of the handwheel is disposed normal to the axis of the mast jacket 14. Further, the telescoping section 18 and the handwheel 20 are axially or longitudinally movable relative to the tiltable housing 16, either concurrently with tilting adjustment or independently thereof, to establish varying longitudinal positions for the handwheel relative to an operator positioned on a seat 22.

With respect to tilt adjustment, the structure of the tiltable housing 16 forms no part of this invention and a full and complete structural description of the former appears in U.S. Pat. No. 3,258,987, issued to Zeigler et al. and assigned to the assignee of this invention. Referring to FIG. 2, however, the tiltable housing 16 generally includes a cylindrical portion 23 having a radially extending web 24 defining a central bore 25. A lock bolt 26, forming part of a coincidental locking arrangement for simultaneously immobilizing the ignition, transmission, and steering, is slidably supported in a bore 27 in the web for fore and aft bodily movement between an extended position, FIG. 2, and a retracted position, not shown, to the left of the extended position. For a full and complete description of the coincidental locking arrangement, reference may be made to U.S. Pat. No. 3,490,255, issued to Wight et al. and assigned to the assignee of this invention. A cylindrical intermediate shaft 28 is rotatably supported on the web 24 within the bore 25 by a pair of spaced anti-friction bearings 30. At its inboard end the intermediate shaft defines a portion of a universal joint type coupling designated generally 32 interconnecting the intermediate shaft 28 and a main steering shaft 34, the main shaft extending the length of the steering column and being connected at its inboard end, not shown, to the vehicle steering gear. The universal joint coupling 32 is, of course, fully described in the aforementioned Zeigler patent, and functions to continuously rotatably couple the main shaft 34 and the intermediate shaft 28 regardless of the angular position of the tiltable housing 16 relative to the mast jacket 14.

With respect to axial adjustment of the handwheel 20 and referring again to FIG. 2, the intermediate shaft 28 includes an internal bore 36 and an access slot 38 intersecting the bore 36. The bore 36 communicates with the rightward end of the intermediate shaft through a smaller bore 40 having a generally D-shaped cross-section defining a flat surface portion 41. A longitudinally oriented relatively narrow slot 42 in the intermediate shaft intersects the flat surface portion 41.

An adjustable shaft 44 having a generally cylindrical body portion 46 and a machined flat surface 48 is slidably supported in the bore 40 of the intermediate shaft, the surface 48 engaging the surface portion 41 of the bore 40 so that while the adjustable shaft 44 is axially shiftable relative to the intermediate shaft 28, the two shafts are coupled or keyed together for unitary rotation about the longitudinal axis of the tiltable housing 16. A stop pin 50 inserted into an appropriate bore in the adjustable shaft through the access slot 38 limits extension or rightward movement of the adjustable shaft relative to the intermediate shaft. The adjustable shaft 44 further includes a serrated or splined head 52 and a threaded end 54 outboard of the splined head.

A circular locking plate 56 including a plurality of peripherally spaced notches 58 is rigidly supported on the intermediate shaft for rotation as a unit with the latter. The notches 58 are radially spaced from the axis of rotation of the locking plate by a distance sufficient to bring succeeding ones of the notches into alignment with the bolt 26 as the intermediate shaft rotates. Therefore, when the bolt 26 is projected rightwardly, as described in the aforementioned Wight patent, the intermediate shaft 28 and, hence, the main steering shaft 34, are rotatably immobilized.

Outboard of the locking plate 56, a generally cylindrical first collar 60 is similarly rigidly attached to the intermediate shaft by conventional means, not shown. As seen best in FIG. 2, the collar 60 partially overlies the leftward end of the slot 42 in the intermediate shaft and defines over the slot a ledge surface 62. Further outboard of the locking plate 56, the intermediate shaft 28 has rigidly attached thereto, as by a set screw 64, a second collar 66 having a bore 68 therein and a threaded counterbore 70 communicating with the bore 68. The axis of the bore 68 and the counterbore 70 is oriented perpendicular to the axis of rotation of the intermediate shaft and hence is disposed transversely with respect to the longitudinal axis of the steering column assembly. A cylindrical cover 72 is rigidly attached to the outboard end of the tiltable housing 16 and projects generally to the rearward edge of the second collar 66.

The steering handwheel 20 includes a hub portion 74 having an internally serrated or splined bore 76. The bore 76 receives the head 52 on the adjustable shaft and the latter is secured to the handwheel by a nut, not shown, received on the threaded end 54. Accordingly, torque applied at the handwheel is at all times positively transferred to the main steering shaft 34 through the adjustable shaft 44 and the intermediate shaft 28 regardless of the angular position of the tiltable housing 16 or the axial position of the adjustable shaft 44. A generally circular backing plate 78 is secured to the inboard surface of the hub portion by a plurality of screws 80 received in appropriate threaded bores. A coil spring 84 is disposed between the plate 78 and the second collar 66 and functions to bias the handwheel, and hence the adjustable shaft 44, rightwardly toward a fully extended position, not shown, wherein the stop pin 50 internally engages the intermediate shaft 28. A generally cup-shaped skirt 86 having a slot 88 therein surrounds the cover 72 and is rigidly clamped to the handwheel 20 by the plate 78.

In accordance with the primary feature of this invention, a locking arrangement is provided for securing the handwheel 20 in any desired axial position which arrangement leaves the center of the adjustable shaft and the hub 74 free of control elements. More particularly, with reference to FIG. 2, the locking arrangement includes a semi-circular key 90 having a flat edge 92 and a curved edge 94. The key 90 is disposed in the slot 42 with the leftward end of the flat edge 92 under and engaging the ledge surface 62 on the first collar 60 and the rightward end of the flat edge 92 underlying the bore 68 in the second collar 66. Intermediate the ends of the flat edge the curved edge 94 engages the flat surface 48 on the adjustable shaft 44. A rod 96 having a blunt end 98 and a threaded shank portion 100 is disposed in the bore 68 with the shank portion 100 threadedly engaging the threaded counterbore 70. Accordingly, rotation of the rod 96 relative to the second collar 66 effects transverse bodily shiftable movement of the rod relative to the steering column. The rod 96 projects through the slot 88 in the skirt 86 and has attached thereto outboard of the skirt a knob 102.

Describing now the operation of the locking arrangement, and assuming the adjustable shaft 44 to be initially freely movable relative to the intermediate shaft, an operator positioned on the seat 22 grasps the handwheel 20 and shifts the latter longitudinally to a comfortable position, the movement of the handwheel being accompanied by relative sliding movement between the adjustable shaft 44 and the intermediate shaft 28. When a comfortable position is achieved, the knob 102 is manually rotated to effect radially inward bodily shiftable movement of the rod 96 and consequent engagement between the blunt end 98 and the rightward end of flat edge 92 on the key 90. After initial engagement, continued rotation of the knob 102 causes the rod 96 to generate on the rightward end of the key 90 a force directed transversely of the axis of rotation of the adjustable shaft. The applied force, of course, tends to pivot the key about a fulcrum formed by the ledge surface 62 in a clockwise direction. Such movement is, however, resisted at the point of engagement between the curved edge 94 of the key 90 and the adjustable shaft 44 whereat force directed normal to the flat surface 48 is generated. The force normal, of course, is accompanied by a substantial friction force resisting relative axial movement between the key 90 and the adjustable shaft 44 and hence between the latter and the intermediate shaft 28.

The magnitude of the friction force depends upon the magnitude of the normal force generated between the key 90 and the adjustable shaft. The normal force, while depending upon the force exerted on the key 90 by the rod 96, is larger than the applied force as a result of the force multiplication characteristic of the key which functions as a simple lever having a fulcrum at one end, a force applied at the other end, and the resisting force encountered between the fulcrum and the applied force. Further, since the applied force is a function of the helix angle of the threads on the shank 100 of the rod and in the counterbore 70, various combinations of helix angle and key size can be calculated to generate any desired friction force at the adjustable shaft for a desired manual force input at the knob 102.

Having thus described the invention, what is claimed is:

1. In a vehicle steering column including an outer support tube, a main steering shaft means disposed on said support tube for rotation about a first axis of the latter, and an adjustable shaft disposed on said support tube for rotation as a unit with said main shaft means and for axial bodily shiftable movement relative thereto along said first axis between a plurality of positions, the combination comprising, a rod disposed on said main shaft means for rotation as a unit therewith and for bodily shiftable movement relative thereto along a second axis perpendicular to said first axis into and out of a locking position, means disposed between said rod and said main shaft means for maintaining said rod in the locking position, and means on said main shaft means defining a lever including a fulcrum portion engaging said main shaft means and a bearing surface adapted for engagement on said rod and a reaction surface between said fulcrum and said bearing surface engaging said adjustable shaft, said rod in the locking position thereof engaging said bearing surface and generating on said lever a force which is multiplied by a factor corresponding to the lever ratio of said lever and exerted by the latter at said reaction surface on said adjustable shaft thereby to generate a friction force of substantial magnitude between said main shaft means and said adjustable shaft for preventing relative axial bodily shiftable movement therebetween.

2. In a vehicle steering column including an outer support tube, a main steering shaft disposed on said support tube for rotation about a first axis of said steering column, an intermediate shaft disposed on said support tube for rotation as a unit with said main shaft about said first axis, and an adjustable shaft disposed on said intermediate shaft for rotation as a unit with the latter about said first axis and for bodily shiftable movement relative to said intermediate shaft along said first axis between a plurality of positions, the combination comprising, a collar, means rigidly supporting said collar on said intermediate shaft for rotation as a unit with the latter, means on said collar defining a threaded bore oriented along a second axis of said steering column disposed perpendicular to said first axis, a rod having a blunt end portion and a threaded shank portion, said threaded shank portion being received in said threaded bore so that said rod is supported on said collar for rotation as a unit with the latter about said first axis and for bodily shiftable movement relative to said collar along said second axis into and out of a locking position, said threaded bore and said threaded shank portion cooperating in maintaining said rod in the locking position, and means on said intermediate shaft defining a lever including a fulcrum portion engaging said intermediate shaft and a bearing surface adapted for engagement on said rod blunt end and a reaction surface between said fulcrum and said bearing surface engaging said adjustable shaft, said rod blunt end in the locking position of said rod engaging said bearing surface and generating on said lever a force which is multiplied by a factor corresponding to the lever ratio of said lever and exerted by the latter at said reaction surface on said adjustable shaft thereby to generate a friction force of substantial magnitude between said intermediate shaft and said adjustable shaft for preventing relative bodily shiftable movement therebetween.

3. In a steering column including an outer support tube, a main steering shaft disposed on said support tube for rotation about a first axis of said steering column, an intermediate shaft disposed on said support tube for rotation as a unit with said main shaft about said first axis, and an adjustable shaft disposed on said intermediate shaft for rotation as a unit with the latter about said first axis and for bodily shiftable movement relative to said intermediate shaft along said first axis between a plurality of positions, the combination comprising, means on said intermediate shaft defining a slot exposing a surface of said adjustable shaft, a first collar disposed around said intermediate shaft and covering a portion of said slot, a key defining a flat edge and a semicircular curved edge, said key being disposed in said slot with one end of said flat edge underlying said first collar and with said semicircular edge engaging said adjustable shaft so that said key defines a lever on said intermediate shaft with a fulcrum at said one end and a bearing surface at the outer end of said flat edge and a reaction surface between said fulcrum and said bearing surface engaging said adjustable shaft, a second collar, means rigidly supporting said second collar on said intermediate shaft for rotation as a unit with the latter, means on said second collar defining a threaded bore oriented along a second axis of said steering column assembly disposed perpendicular to said first axis and intersecting said bearing surface on said key, and a rod having a blunt end portion and a threaded shank portion, said threaded shank portion being received in said threaded bore so that said rod is supported on said second collar for rotation as a unit with the latter about said first axis and for bodily shiftable movement relative to said second collar along said second axis into and out of a locking position, said threaded bore and said threaded shank portion cooperating in maintaining said rod in the locking position and said rod blunt end in the locking position of said rod engaging said key bearing surface and generating on said key a force which is multiplied by a factor corresponding to the lever ratio of said key and exerted by the latter at said reaction surface on said adjustable shaft thereby to generate a friction force of substantial magnitude between said intermediate shaft and said adjustable shaft for preventing relative bodily shiftable movement therebetween.

* * * * *